Patented June 26, 1934

1,964,041

UNITED STATES PATENT OFFICE 1,964,041

MANUFACTURE OF ALIPHATIC ANHYDRIDES

Henry Dreyfus, London, England

No Drawing. Application February 10, 1931, Serial No. 514,903. In Great Britain May 2, 1930

13 Claims. (Cl. 260—123)

This invention relates to the manufacture of aliphatic anhydrides by the thermal decomposition of aliphatic acids, and especially to the manufacture of acetic anhydride by the thermal decomposition of acetic acid.

In my United States Patent No. 1,735,959 issued 19th November, 1929 I have described inter alia how aliphatic anhydrides can be prepared by thermally decomposing the vapours of aliphatic acids and condensing the reaction gases or vapours by passing them in contact with a solvent or mixture of solvents of higher boiling point than water (and preferably of boiling point up to 200–300° C. or more), and maintained at a temperature at which the water remains in gaseous or vapour form.

I have now found that aryl ethers of formula $ROR_1$ (where R is an aryl group having at least eight carbon atoms and where $R_1$ is an alkyl, aralkyl or aryl group) are, in view of their high boiling point, low solubility or substantial insolubility in water, and high solvent power for anhydrides and chemically inert behaviour towards anhydrides, especially useful solvents for such method of condensation.

According to the invention, therefore, I manufacture acetic anhydride or other aliphatic anhydrides by subjecting the vapours of acetic acid or other aliphatic acid to thermal decomposition and by condensing the hot reaction gases or vapours by passing them through or otherwise in contact with one or more aryl ethers of formula $ROR_1$ maintained at temperatures at which the water remains in gaseous or vapour form.

As examples of such aryl ethers of formula $ROR_1$ I may mention α-naphthol-methylether, α-naphthol-ethylether, β-naphthol-methylether, β-naphthol-ethylether, β-naphthol-paratolylether, β-naphthol-propylether, β-naphthol-isopropylether, phenyl-β-naphthylether, benzyl-β-naphthylether, or mixtures of any of such solvents together. Mixtures of one or more of said solvents together with any of the high boiling solvents described in my previous United States Patent No. 1,735,959 may, if desired, be employed. Preferably I employ such ethers of formula $ROR_1$ as are liquid at the temperatures employed; for instance α- or β-naphthol-ethyl-, methyl- or propyl-ether, though it is of course understood that I do not limit myself in this respect as I may even employ solvents which have melting points above the temperature employed.

In performing the invention I may pass the hot reaction gases or vapours through or otherwise in contact with the ether or ethers of formula $ROR_1$ maintained at a temperature intermediate between the boiling points of water and of the aliphatic anhydride-solvent mixture under the conditions obtaining.

The ether or ethers of formula $ROR_1$ used for absorbing the anhydride may be treated in any suitable way for recovering the absorbed anhydride. Thus, for instance, they may be heated to drive off the anhydride or subjected to fractional distillation after being removed from the apparatus. Preferably, however, I effect the recovery of the anhydride by combining the recovery with the absorption, by circulating the ether or ethers from the absorption zone through apparatus heated to a higher temperature whereby the anhydride may be partially or entirely separated or distilled off from the ether or ethers of formula $ROR_1$, and then returning the ether or ethers of formula $ROR_1$ to the absorption zone, thus maintaining a continuous circulation of the absorbing solvent or solvent mixture and continuous recovery of the anhydride.

Instead of using the ether or ethers of formula $ROR_1$ in liquid form for absorbing the anhydride, vapours of the ether or ethers of formula $ROR_1$ may be mixed with the hot reaction gases or vapours and the resulting mixture subjected to condensation at temperatures above the boiling point of water.

The aliphatic acid vapours may be subjected to the thermal decomposition in any convenient manner in presence or absence of catalysts; for instance the aliphatic acid vapour may be passed through tubes (or other reaction vessel) made of copper, fireclay, fused silica, staybrite or other suitable material heated to the desired temperature, e. g. about 350–1000° C. and preferably between about 500 and 800° C.

In cases where the thermal decomposition is performed in presence of catalysts, any catalysts capable of promoting the thermal scission of aliphatic acids into their anhydrides may be used, whether such catalysts are solids, liquids or gases, under the conditions of the reaction. For instance the catalysts specified in previous United States Patents Nos. 1,735,956, 1,735,962, 1,972,029, 1,872,030, 1,883,353, 1,911,942 and 1,915,572 may usefully be employed.

It will be understood that the invention is not limited as to the strength of the aliphatic acid employed. The process can be performed even with vapours of dilute acids and besides affording a ready means for the manufacture of anhydrides from concentrated or highly concentrated acids, it affords valuable means for the production of anhydrides from waste or dilute acids, such for instance as result from the acetylization of cellulose or other industrial acetylization processes.

What I claim and desire to secure by Letters Patent is:—

1. In a process for the manufacture of a lower fatty acid anhydride by subjecting the vapor of a lower fatty acid to thermal decomposition, the step of condensing the anhydride from the reaction vapors in presence of a solvent comprising a substantial proportion of at least one aryl ether of formula $ROR_1$, where R is a naphthyl group and where $R_1$ is an alkyl, benzyl or aryl of the benzene series group, at a temperature at which the water remains gaseous.

2. In a process for the manufacture of acetic anhydride by subjecting acetic acid vapor to thermal decomposition, the step of condensing the anhydride from the reaction vapors in presence of a solvent comprising a substantial proportion of at least one aryl ether of formula $ROR_1$ where R is a naphthyl group and where $R_1$ is an alkyl, benzyl or aryl of the benzene series group, at a temperature at which the water remains gaseous.

3. In a process for the manufacture of a lower fatty acid anhydride by subjecting the vapor of a lower fatty acid to thermal decomposition, the step of condensing the anhydride from the reaction vapors by passing them in contact with a solvent comprising a substantial proportion of at least one aryl ether of formula $ROR_1$, where R is a naphthyl group and where $R_1$ is an alkyl, benzyl or aryl of the benzene series group, at a temperature at which the water remains gaseous.

4. In a process for the manufacture of acetic anhydride by subjecting acetic acid vapor to thermal decomposition, the step of condensing the anhydride from the reaction vapors by passing them in contact with a solvent comprising a substantial proportion of at least one aryl ether of formula $ROR_1$, where R is a naphthyl group and where $R_1$ is an alkyl, benzyl or aryl of the benzene series group, at a temperature at which the water remains gaseous.

5. In a process for the manufacture of a lower fatty acid anhydride by subjecting the vapor of a lower fatty acid to thermal decomposition, the step of condensing the anhydride from the reaction vapors by passing them in contact with a solvent comprising a substantial proportion of $\beta$-naphthol-ethyl ether, at a temperature at which the water remains gaseous.

6. In a process for the manufacture of acetic anhydride by subjecting acetic acid vapor to thermal decomposition, the step of condensing the anhydride from the reaction vapors by passing them in contact with a solvent comprising a substantial proportion of $\beta$-naphthol-ethyl ether, at a temperature at which the water remains gaseous.

7. In a process for the manufacture of a lower fatty acid anhydride by subjecting the vapor of a lower fatty acid to thermal decomposition, the step of mixing the hot reaction vapors with the vapor of a solvent comprising a substantial proportion of at least one aryl ether of formula $ROR_1$, where R is a naphthyl group and where $R_1$ is an alkyl, benzyl or aryl of the benzene series group, at a temperature above the boiling point of the anhydride, and thereafter subjecting the resulting mixture to condensation at a temperature at which the water remains gaseous.

8. In a process for the manufacture of acetic anhydride by subjecting acetic acid vapor to thermal decomposition, the step of mixing the hot reaction vapors with the vapor of a solvent comprising a substantial proportion of at least one aryl ether of formula $ROR_1$, where R is a naphthyl group and where $R_1$ is an alkyl, benzyl or aryl of the benzene series group, at a temperature above the boiling point of the anhydride, and thereafter subjecting the resulting mixture to condensation at a temperature at which the water remains gaseous.

9. In a process for the manufacture of a lower fatty acid anhydride by subjecting the vapor of a lower fatty acid to thermal decomposition at a temperature between 500° and 800° C., the step of condensing the anhydride from the reaction vapors in presence of a solvent comprising a substantial proportion of at least one aryl ether of formula $ROR_1$, where R is a naphthyl group and where $R_1$ is an alkyl, benzyl or aryl of the benzene series group, maintained at a temperature at which the water remains gaseous.

10. In a process for the manufacture of acetic anhydride by subjecting acetic acid vapor to thermal decomposition at a temperature between 500° and 800° C., the step of condensing the anhydride from the reaction vapors in presence of a solvent comprising a substantial proportion of at least one aryl ether of formula $ROR_1$, where R is a naphthyl group and where $R_1$ is an alkyl, benzyl or aryl of the benzene series group, maintained at a temperature at which the water remains gaseous.

11. In a process for the manufacture of a lower fatty acid anhydride by subjecting the vapor of a lower fatty acid to thermal decomposition at a temperature between 500° and 800° C., the step of condensing the anhydride from the reaction vapors by passing them in contact with a solvent comprising a substantial proportion of at least one aryl ether of formula $ROR_1$, where R is a naphthyl group and where $R_1$ is an alkyl, benzyl or aryl of the benzene series group, maintained at a temperature at which the water remains gaseous.

12. Process for the separation of the vapor of a lower fatty acid anhydride from mixtures comprising the vapor of a lower fatty anhydride and water vapor, which comprises condensing the anhydride in presence of a solvent comprising a substantial proportion of at least one aryl ether of formula $ROR_1$, where R is a naphthyl group, and where $R_1$ is an alkyl, benzyl or aryl of the benzene series group, at a temperature at which the water remains gaseous.

13. Process for the separation of the vapor of acetic anhydride from mixtures comprising the vapor of acetic anhydride and water vapor, which comprises condensing the anhydride in presence of a solvent comprising a substantial proportion of at least one aryl ether of formula $ROR_1$, where R is a naphthyl group, and where $R_1$ is an alkyl, benzyl or aryl of the benzene series group, at a temperature at which the water remains gaseous.

HENRY DREYFUS.